US010635826B2

(12) United States Patent
Aghdam et al.

(10) Patent No.: US 10,635,826 B2
(45) Date of Patent: Apr. 28, 2020

(54) SYSTEM AND METHOD FOR SECURING DATA IN A STORAGE MEDIUM

(71) Applicants: Majid Hatami Aghdam, Los Angeles, CA (US); Navid Bahrami, Los Angeles, CA (US)

(72) Inventors: Majid Hatami Aghdam, Los Angeles, CA (US); Navid Bahrami, Los Angeles, CA (US)

(73) Assignee: Monkey Soltion LLC, Los Angeles, CA (US)

( * ) Notice: Subject to any disclaimer, the term of this patent is extended or adjusted under 35 U.S.C. 154(b) by 0 days.

(21) Appl. No.: 16/530,508

(22) Filed: Aug. 2, 2019

(65) Prior Publication Data
US 2019/0354697 A1 Nov. 21, 2019

Related U.S. Application Data

(60) Provisional application No. 62/818,421, filed on Mar. 14, 2019.

(51) Int. Cl.
| | |
|---|---|
| *G06F 21/60* | (2013.01) |
| *H04L 9/06* | (2006.01) |
| *H04L 9/08* | (2006.01) |
| *G06F 21/62* | (2013.01) |
| *H04L 9/32* | (2006.01) |

(52) U.S. Cl.
CPC .......... *G06F 21/602* (2013.01); *H04L 9/0643* (2013.01); *H04L 9/0869* (2013.01); *G06F 21/62* (2013.01); *H04L 9/3236* (2013.01); *H04L 9/3239* (2013.01)

(58) Field of Classification Search
CPC ........ G06F 21/602; G06F 21/60; G06F 21/62; H04L 9/0643; H04L 9/0869; H04L 9/06; H04L 9/08; H04L 9/32; H04L 9/3236; H04L 9/3239
See application file for complete search history.

(56) References Cited

U.S. PATENT DOCUMENTS

| | | | | |
|---|---|---|---|---|
| 5,883,956 A | * | 3/1999 | Le | G06F 21/572 380/52 |
| 9,876,772 B1 | * | 1/2018 | Statica | H04L 63/0421 |
| 2010/0257365 A1 | * | 10/2010 | Anchan | H04L 63/068 713/171 |

(Continued)

*Primary Examiner* — Jayesh M Jhaveri
(74) *Attorney, Agent, or Firm* — Barry Choobin; Patent 360

(57) ABSTRACT

A system and method for securing data in a storage medium is disclosed. The system comprises a computing device, a database in communication with the computing device, and a user device including the storage medium is configured to access the computing device via a network. Computing device is configured to collect one or more parameters from at least one of the user device and the computing device. A seed key is generated based on the parameters using a digest algorithm. The computing device is configured generate a key using the seed key and MD5 and semi-Random SHA encryption. The computing device is configured to use the key to encrypt or decrypt data that accesses to and from a portion of the storage medium. The computing device is configured to execute encrypt and decrypt process through inline function without storing keys. The parameter includes server paired parameters and user device parameters.

17 Claims, 5 Drawing Sheets

(56) References Cited

U.S. PATENT DOCUMENTS

| | | | | |
|---|---|---|---|---|
| 2012/0290837 A1* | 11/2012 | Vion-Dury | ............... | H04L 9/14 |
| | | | | 713/167 |
| 2013/0142323 A1* | 6/2013 | Chiarella | ............ | H04L 63/0428 |
| | | | | 380/28 |
| 2014/0358777 A1* | 12/2014 | Gueh | ................ | G06Q 20/3223 |
| | | | | 705/43 |
| 2016/0087947 A1* | 3/2016 | Wong | ................. | G06F 21/6218 |
| | | | | 713/171 |
| 2018/0083785 A1* | 3/2018 | Shields | ................ | H04L 9/3239 |

* cited by examiner

SYSTEM AND METHOD FOR SECURING DATA IN A STORAGE MEDIUM

BACKGROUND OF THE INVENTION

A. Technical Field

The present invention generally relates to encryption and decryption of data, and more specifically relates to a system and method for securely storing data or encrypting internet stream payload without storing the unique encryption key on the storage medium

B. Description of Related Art

Traditionally, storing data on a system is secured using a static key encryption or password on storage medium such as hard disk or solid-state drive or an internal flash chip of mobile or tablet devices. Also, data payload over the internet is secured using a token generated from original password or key after authentication with the backend system. These types of data security can be easily cracked by third parties and relatively easy for a non-authorized user to read. Also, data transmission from one source to another source over a transmitting channel could also be stolen easily. Hence sensitive data need to be encrypted, thereby improving security. Data encryption is one of the most important and value-added process for secured electronic data transfer.

Strong encryption is an essential defense for sensitive data such as military information, institution and corporations. Encryption process involves conversion of data into unpredictable secret code or keys and the keys are stored in the memory unit of the same device or external device. Storing the encrypted data on any device has always risks. The encrypted data stored in any form of memory unit can be easily monitored by de-processing of device via looking at the memory unit interface directly. In addition, the data could be recovered and encryption keys could be cracked easily with keys stored on the system.

There are many other secured storage frameworks and technologies are known in the art. But most of them require storing a hash file or a secret key or a predefined key or technologies introduced by giant companies, which are not open source. Additionally, there are always bugs which leads to risk of leaking user information to public. For example, Apple® has introduced iCloud® Keychain system for secure data transfer and password management. With iCloud® Keychain, a user can safely and securely store their personal credentials such as username, passwords, and even credit card numbers on their Mac®, iPhone® or iPad® Keychain. It will be synced across all the user devices. But, other service such as a rouge application running on a Mac can easily break into Apple® Keychain password vault and steal all the user credentials stored therein.

It shows that applications with their security relies on mobile device operating system or SDKs, may be the victims of attacks and may destroy their business or reputation. The other issue with TPM RSA Chips is improper key generation on the market. The chip is widely used on many computer devices and even military equipment.

Also, cloning of a device makes it possible for a hacker to be able to read data or sniff network traffic.

User Account bounded password for communication or data storage is also not secure. The original password or static hash of the password usually resides on the backend and it is important to secure user passwords even on the backend.

Therefore, there is a need for a system and method for securely storing data without storing the unique encryption key on the storage medium. Also, there is a need for a system to keep keys secure against memory attacks and bind the encryption key to the user device and session and hardware specific data.

SUMMARY OF THE INVENTION

A system and method for securing data in a storage medium is disclosed. In one embodiment, the system for securing data in a storage medium comprises a computing device, a database and a user device. The computing device or server comprises a processor and a memory unit in communication with the processor. The memory unit stores a set of instructions executable by the processor. The database in communication with the computing device. The user device including the storage medium is configured to access the computing device via a network. The computing device is configured to collect one or more parameters from the user device. In one embodiment, the computing device is configured to collect one or more parameters from at least one of the user device and the computing device or server. In another embodiment, the computing device is configured to collect one or more parameters from the user device and the server. The computing device is further configured to generate a seed key based on the parameters using a random digest algorithm. The computing device is configured to generate a key using the seed key and MD5 and semi-random SHA encryption. The computing device is further configured to use the generated key to encrypt or decrypt data that accesses to and from a portion of the storage medium.

In one embodiment, the parameters include local storage and server communicator. In one embodiment, the server paired parameters are application installation session UUID, application installation session hash, installation path, phone number, OS name and signup request epoch time. In one embodiment, the user device parameters are application installation session UUID, application installation session hash, installation path, phone number, OS name and signup request epoch time, and application modification date epoch time. In one embodiment, the parameter could be modified by the user. In one embodiment, the system is configured to execute encrypt and decrypt process through inline function without storing keys. The system is configured to create a unique seed key for each user device.

In one embodiment, a method for securing data in a storage medium is disclosed. The method is incorporated in a system comprising a computing device comprising a processor and a memory unit in communication with the processor, wherein the memory unit stores a set of instructions executable by the processor, a database in communication with the computing device, and a user device including the storage medium is configured to access the computing device via a network. The method comprises the steps of: collecting one or more parameters from the user device. The method further comprises a step of: generating a seed key based on the parameters using a random digest algorithm. The method further comprises a step of: generating a key using the seed key and MD5 and semi-random SHA encryption. The method further comprises a step of: using the key to encrypt or decrypt data that accesses to and from a portion of the storage medium.

In another embodiment, a method for securing communication of information via a network incorporated in a system is disclosed. The system comprises a computing device comprising a processor and a memory unit in communication with the processor, wherein the memory unit stores a set of instructions executable by the processor, a database in communication with the computing device, and a user device including the storage medium is configured to access the computing device via the network. The method comprises the step of: collecting one or more parameters from the user device. The method further comprises the step of: collecting one or more parameters from the server. The method further comprises the step of: generating a seed key based on the parameters using a random digest algorithm. The method further comprises the step of: generating a key using the seed key and MD5 and semi-random SHA encryption. The method further comprises the step of: using the key to encrypt or decrypt data that access to and from a portion of the storage medium.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which.

DETAILED DESCRIPTION OF EMBODIMENTS

Figure 1:
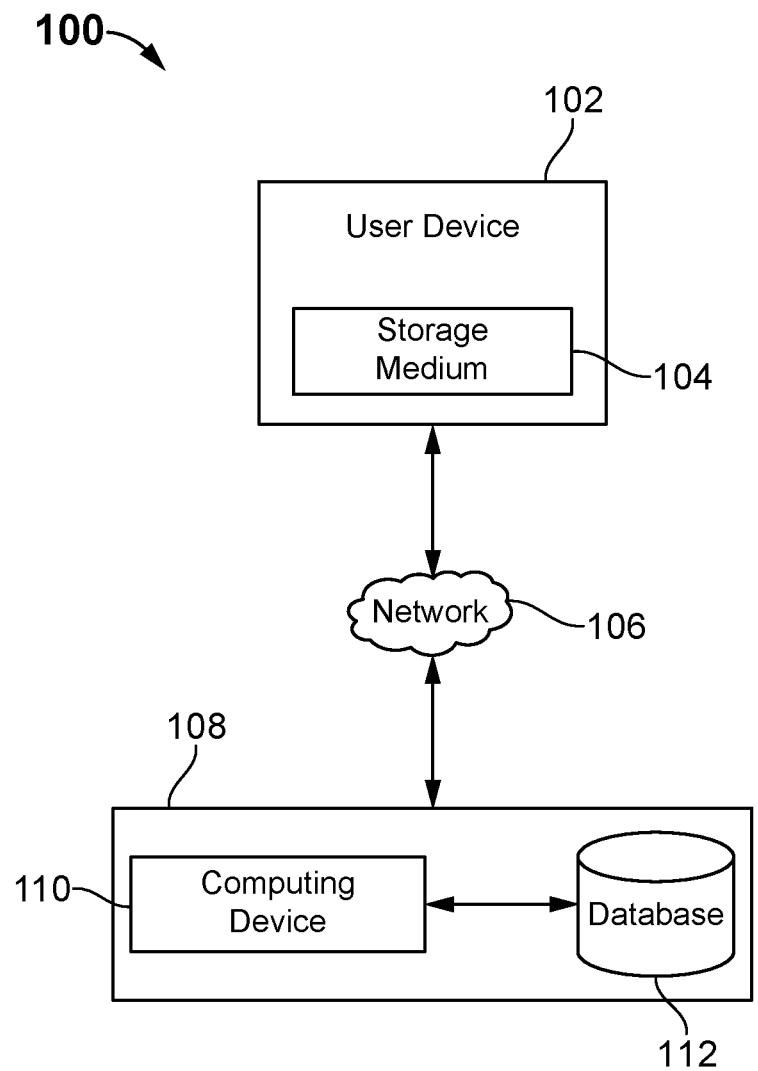
FIG. 1 exemplarily illustrates a block diagram of an environment implemented according to an embodiment of the present invention.

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Reference will now be made in detail to various embodiments. Each example is provided by way of explanation, and is not meant as a limitation and does not constitute a definition of all possible embodiments. The described embodiments are to be considered in all respects only as illustrative and not restrictive. For purposes of illustrating features of the embodiments, a simple example will now be introduced and referenced throughout the disclosure. Those skilled in the art will recognize that this example is illustrative and not limiting and is provided purely for explanatory purposes. An example of a computing system environment is disclosed. The computing system environment is not intended to suggest any limitation as to the scope of use or functionality of the system and method described herein. Neither should the computing environment be interpreted as having any dependency or requirement relating to any one or combination of components illustrated in the exemplary operating environment.

Embodiments of the disclosure are operational with numerous other general purpose or special purpose computing system environments or configurations. Examples of well-known computing systems, environments, and/or configurations that may be suitable for use with the systems and methods described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The embodiments of the disclosure may be described in the general context of computer-executable instructions, such as program modules, being executed by a computer. Generally, program modules include routines, programs, objects, components, data structures, etc. that perform particular tasks or implement particular abstract data types. The systems and methods described herein may also be practiced in distributed computing environments where tasks are performed by remote processing devices that are linked through a communications network. In a distributed computing environment, program modules may be located in both local and remote computer storage media including memory unit or storage devices. Tasks performed by the programs and modules are described below and with the aid of figures. Those skilled in the art can implement the exemplary embodiments as processor executable instructions, which can be written on any form of a computer readable media in a corresponding computing environment according to this disclosure.

Components of computer may include, but are not limited to, a processing unit, a system memory, and a system bus that couple various system components including the system memory to the processing unit. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer includes a variety of computer readable media. Computer readable media can be any available media that can be accessed by computer and includes both volatile and non-volatile media, removable and non-removable media. By way of example, and not limitation, computer readable media may include computer storage media and communication media. Computer storage media includes both volatile and non-volatile, removable and non-removable media implemented in any method or technology for storage of information such as computer readable instructions, data structures, program modules or other data. Computer storage media includes, but not limited to, Random Access Memory (RAM), Read-Only Memory (ROM), Electrically Erasable Read-Only Memory (EEPROM), flash memory or other memory technology, Compact Disk Read-Only Optical Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer.

Communication media embodies one or more of computer readable instructions, data structures, program modules, and the like, and/or other data in a modulated data signal such as a carrier wave or other transport mechanism, and may include any known information delivery media consistent with this disclosure. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory includes computer storage media in the form of volatile and/or non-volatile memory such as read only memory (ROM) and random-access memory (RAM). A basic input/output system (BIOS), containing the basic routines that help to transfer information between elements within computer, such as during start-up, may be stored in ROM. RAM may contain data and/or program modules that are readily accessible by a processing unit. By way of example, and not limitation, such data and/or program modules may include an operating system, application programs, other program modules, and program data.

The computer may also include other removable/non-removable volatile/non-volatile computer storage media. By way of example only, a hard disk drive that reads from or writes to non-removable, non-volatile magnetic media, a magnetic disk drive that reads from or writes to a removable, non-volatile magnetic disk, and an optical disk drive that reads from or writes to a removable, non-volatile optical disk such as a CD ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive may be connected to the system bus through a non-removable memory interface, and magnetic disk drive and optical disk drive may be connected to the system bus by a removable memory interface.

The drives and their associated computer storage media provide storage of computer readable instructions, data structures, program modules and other data for the computer. For example, hard disk drive disclosed stores operating system, application programs, other program modules, and program data. Each of the storing operating system, the application programs, the other program modules, and the program data may be the same as or different from the operating system, the application programs, the other program modules, and the program data described hereinabove. The operating system, the application programs, the other program modules, and the program data are given different numbers here to illustrate that, at a minimum, they are different copies.

A user may enter commands and information into the computer through input devices such as a keyboard, a microphone, and a pointing device, such as a mouse, trackball or touch pad. Other input devices (not shown) may include a joystick, game pad, satellite dish, scanner, or the like. These and other input devices may be connected to the processing unit through a user input interface that is coupled to the system bus, but may be connected by other interface and bus structures, such as a parallel port, game port or a universal serial bus (USB). A monitor or other type of display device is also connected to the system bus via an interface, such as a video interface. In addition to the monitor, computers may also include other peripheral output devices such as speakers and printer, which may be connected through an output peripheral interface.

The computer may operate in a networked environment using logical connections to one or more remote computers, such as a remote computer. The remote computer may be a personal computer, a hand-held device, a server, a router, a network PC, a peer device or other common network node, and may include one, more or all of the elements described above relative to the computer. The logical connections include a local area network (LAN) and a wide area network (WAN). It is contemplated that the logical connections may include other networks. These other networks may be included in combination with the LAN and WAN. Such networking environments are commonplace in offices, enterprise-wide computer networks, intranets and the Internet.

When used in a LAN networking environment, the computer is connected to the LAN through a network interface or adapter. When used in a WAN networking environment, the computer includes a modem or other means for establishing communications over the WAN, such as the Internet. The modem, which may be internal or external, may be connected to the system bus via the user input interface, or other appropriate mechanism. In a networked environment, program modules depicted relative to the computer, or portions thereof, may be stored in a remote memory unit or storage device. It will be appreciated that the network connections shown are exemplary and other means of establishing a communications link between the computers may be used.

The present invention discloses a system and method for securing data in a storage medium. The system is configured to secure data in the storage medium without storing the key or password. Referring to FIG. 1, a block diagram of an environment 100 implemented in accordance with various embodiments of the present invention is disclosed. The environment 100 comprises a user device 102, a network 106, and a data securing system 108. In an embodiment, the data securing system 108 comprises a data securing server or computing device 110 and at least one database 112. In one embodiment, the user device 102 is enabled to access the data securing system 108 via the network 106. In one embodiment, the user device 102 is at least one desktop, a laptop, a tablet, a mobile phone, and mobile and/or handheld electronic devices. In an embodiment, the user device 102 including a storage medium 104 is in communication with the network 106 to access the server 110. In one embodiment, the storage medium 104 is end user application data storage. In an embodiment, the network 106 could be Wi-Fi network, WiMax network, and wireless local area network.

In one embodiment, the database 112 may be accessible by the server 110. The database 112 may be integrated into the server 110 or separate from it. In some embodiments, the database 112 resides in a connected server or in a cloud computing service. Regardless of location, the database 112 comprises a memory unit to store and organize certain data for use by the server. In one embodiment, the server 110 is at least one of a general or special purpose computer. The server 110 could be operated as a single computer, which can be a hardware and/or software server, a workstation, a desktop, a laptop, a tablet, a mobile phone, a mainframe, a supercomputer, a server farm, and so forth. In some embodiments, the computer could be touchscreen and/or non-touchscreen and adopted to run on any type of OS, such as iOS™, Windows™, Android™, Unix™, Linux™ and/or others. In one embodiment, the plurality of computers is in communication with each other, via networks. Such communication can be via a software application, a mobile app, a browser, an OS, and/or any combination thereof.

In one embodiment, the computing device or server 110 comprises a processor and a memory unit in communication with the processor. The memory unit stores a set of instructions executable by the processor. The computing device 110 is configured to collect one or more parameters from the user device 102. In one embodiment, the computing device 110 is configured to collect one or more parameters from at least one of the user device 102 and the server 110. In another embodiment, the computing device 110 is configured to collect one or more parameters from the user device 102 and the server 110. The computing device 110 is further configured to generate a seed key based on the parameters using a random digest algorithm. The computing device 110 is configured to generate a key using the seed key and MD5 and semi-random SHA encryption. The computing device 110 is further configured to use the generated key to encrypt or decrypt data that accesses to and from a portion of the storage medium 104.

In one embodiment, the keys are generated by the present invention for encryption and decryption using unknown keys upon setup and is unique for each user device and application installation. Each device has its own key and each installation of the application generates a different key. This protects data storage on disk against data recovery. Also, to keep keys secure against memory attacks, the keys are not stored in memory unit and is used to decrypt or encrypt inline without requiring to pass it. The computing device 110 also enables to migrate locally stored data from old version to new version, the last byte of the code is always the version of the encryption which is from 0x00 to 0xFF, which provides 256 versions space to upgrade. In one embodiment, the present invention uses AES encryption algorithm since the combinations of keys are massive.

In one embodiment, two kinds of key generation are disclosed. The two kinds of key generation include local storage and server communicator. In one embodiment, the server paired parameters are application installation session UUID, application installation session hash, installation path, phone number, OS name and signup request epoch time. In one embodiment, the user device parameters are application installation session UUID, application installation session hash, installation path, phone number, OS name and signup request epoch time, and application modification date epoch time. In one embodiment, the parameter could be modified by the user.

Depending upon the parameters data, the computing device 110 is configured to generate a seed key which will be used in digest algorithm to generate salts for key generation. For any reason, if device has been restored (like in iTunes on Apple), the session becomes invalid and all stored data will be lost. This is one of the issues of some application where some hackers or government agencies recover data from mobile devices or backups and where able to read history of the user communications. Some parameters like application modification data are important because an intruder may inject a framework or code intro a jailbroken device to crack the encryption.

Further, the generated seed key is used to decrypt or encrypt data on system or for communication. The process is always processed through inline code and without keeping memory storage of the key. The output of the encryption process is always a base 64 binary data which is suitable to be stored locally and for sending to server 110. At the end of the encryption process, one byte of data appends at the end of array to indicate the version of the system to be used for decryption process usage. For local data storage, the system always validates storage result and upon failure it will retry the process in a queue until succeed unless the issue is fake key or invalid data. The reason behind the process is the issue of low memory or available disk space on the computer device, but if the user exits the application, the queue will be emptied and no further process will be done.

Figure 2:
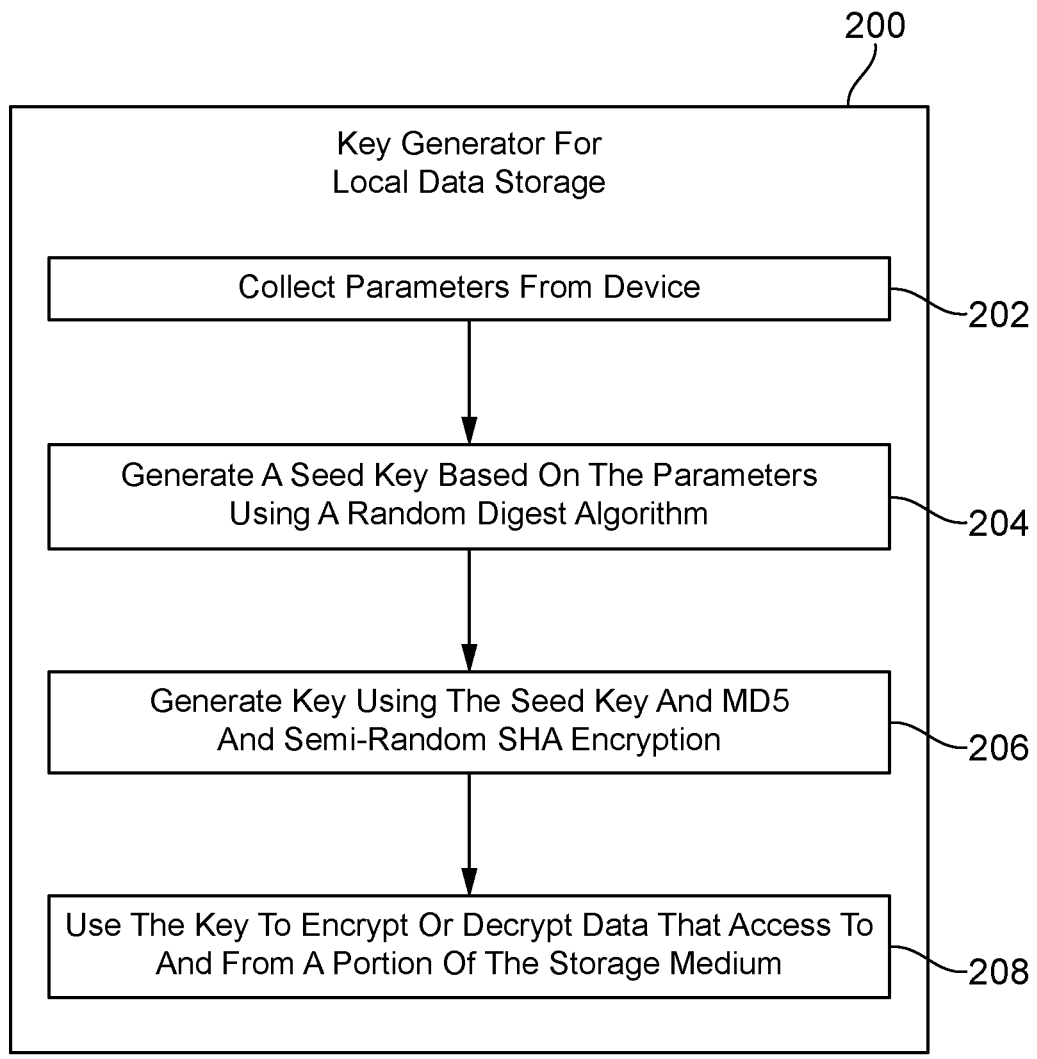
FIG. 2 exemplarily illustrates a method for securing data in a storage medium according to an embodiment of the present invention.

Referring to FIG. 2, a method 200 for securing data in a storage medium incorporated in a system comprising a computing device comprising a processor and a memory unit in communication with the processor, wherein the memory unit stores a set of instructions executable by the processor, a database in communication with the computing device, and a user device including the storage medium is configured to access the computing device via a network. The method 200 comprises the step 202 of: collecting one or more parameters from the user device. The method 200 further comprises a step 204 of: generating a seed key based on the parameters using a random digest algorithm. The method 200 further comprises a step 206 of: generating a key using the seed key and MD5 and semi-random SHA encryption. The method 200 further comprises a step 208 of: using the key to encrypt or decrypt data that accesses to and from a portion of the storage medium.

Figure 3:
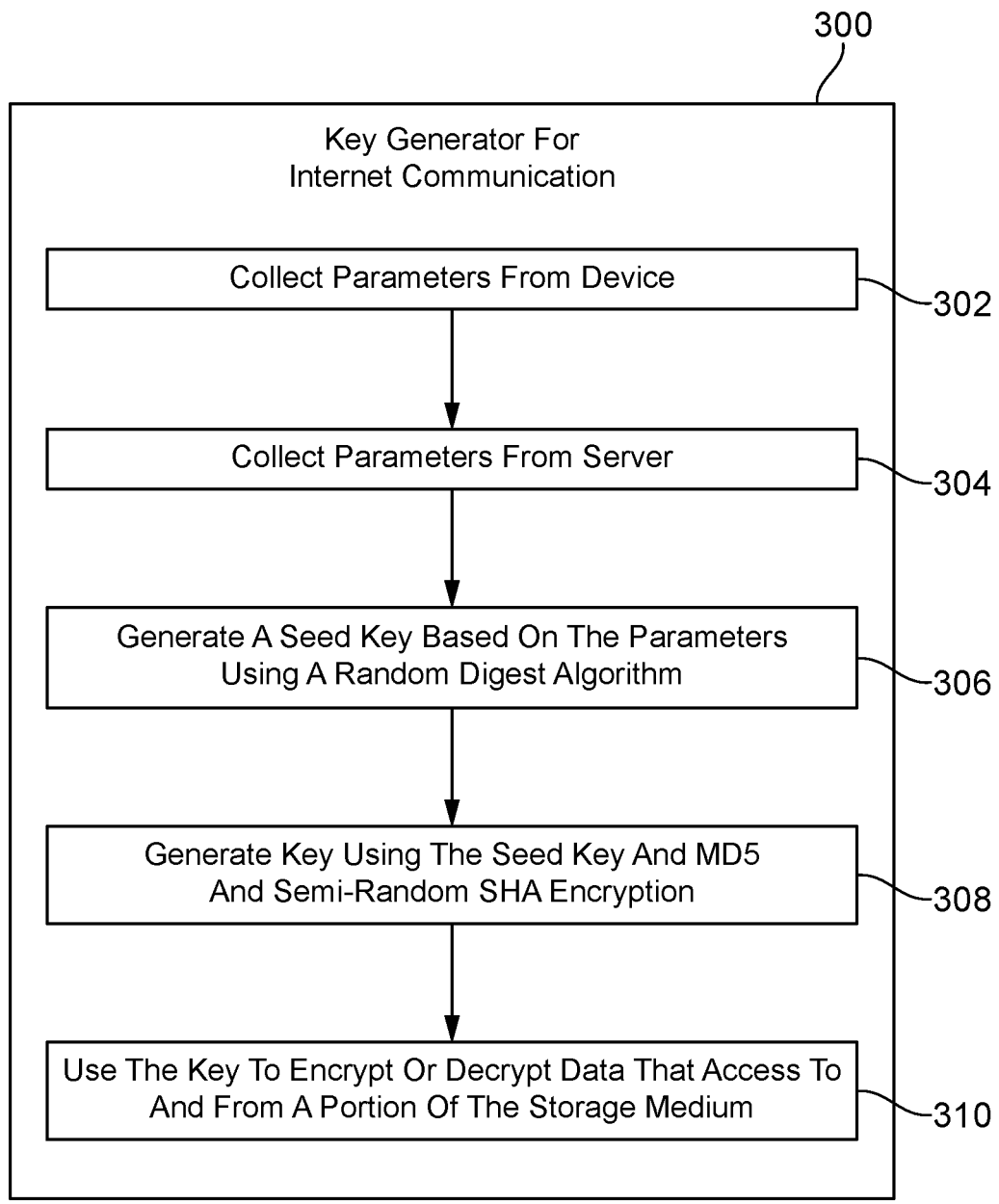
FIG. 3 exemplarily illustrates a method for securing internet communication according to an embodiment of the present invention.

Referring to FIG. 3, a method 300 for securing communication of information via a network incorporated in a system comprising a computing device comprising a processor and a memory unit in communication with the processor, wherein the memory unit stores a set of instructions executable by the processor, a database in communication with the computing device, and a user device including the storage medium is configured to access the computing device via the network. The method 300 comprises the step 302 of: collecting one or more parameters from the user device. The method 300 further comprises the step 304 of: collecting one or more parameters from the server. The method 300 further comprises the step 306 of: generating a seed key based on the parameters using a random digest algorithm. The method 300 further comprises the step 308 of: generating a key using the seed key and MD5 and semi-random SHA encryption. The method 300 further comprises the step 310 of: using the key to encrypt or decrypt data that access to and from a portion of the storage medium.

Figure 4:
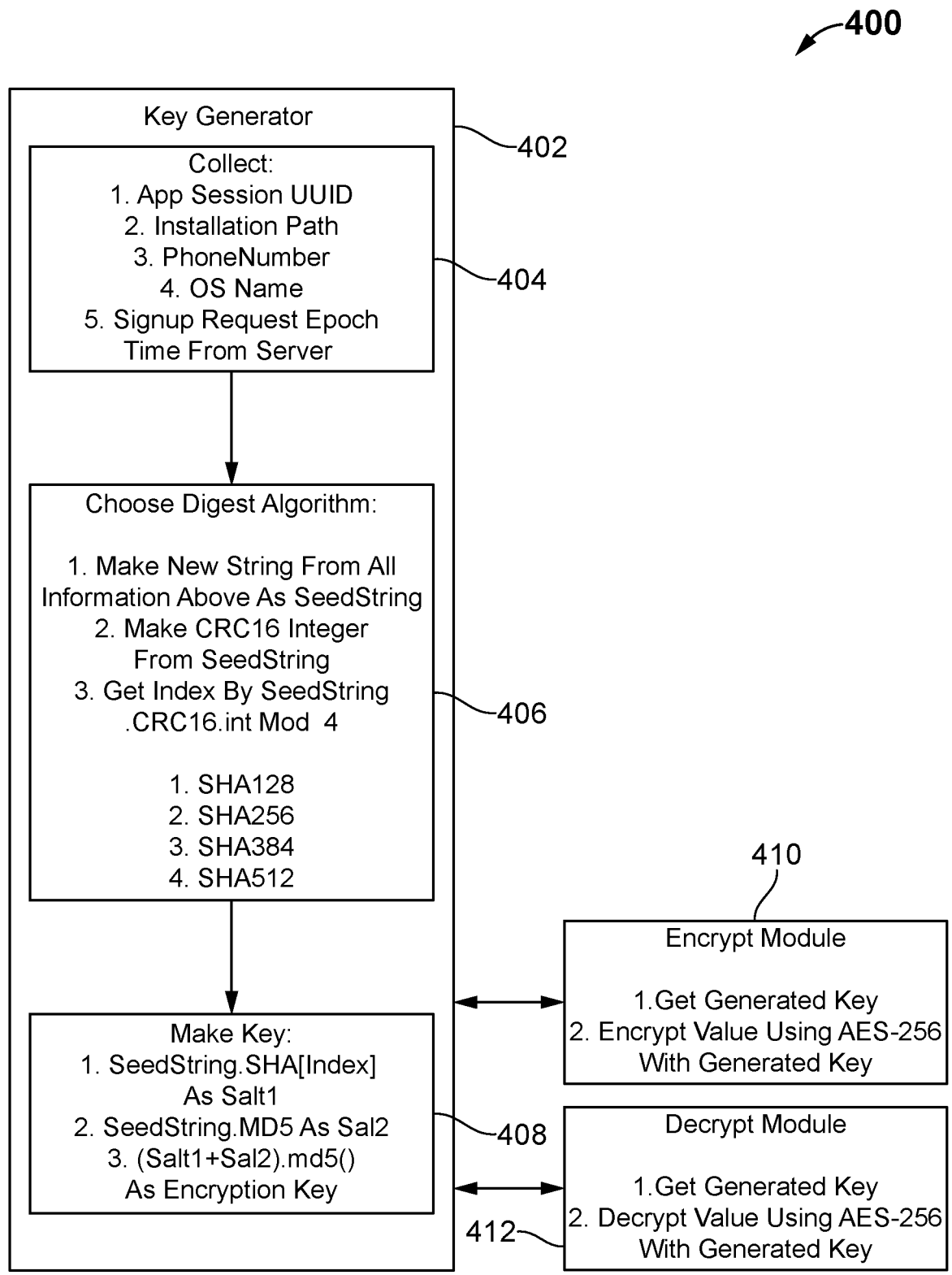
FIG. 4 exemplarily illustrates a method for generating seed key in an embodiment of the present invention.

FIG. 4 exemplarily illustrates a block diagram 400 of a system for generating seed key in an embodiment of the present invention. In one embodiment, the system comprising a computing device comprising a processor and a memory unit in communication with the processor, wherein the memory unit stores a key generator 402 executable by the processor, a database in communication with the computing device, and a user device including the storage medium is configured to access the computing device via a network. A process involved in key generation is explained as follows. At step 404, the key generator 402 is configured to collect application session UUID, installation path, phone number, OS name and signup request epoch time from server. At step 406, a new seed string is made using the collected information using a digest algorithm. At step 408, an encryption key is generated for encryption/decryption of data. The memory unit further stores an encryption module 410 configured to use the generated key to encrypt value using Advanced Encryption Standard (AES). The memory unit further stores a decryption module 412 configured to use the generated key to decrypt value using AES.

Figure 5:
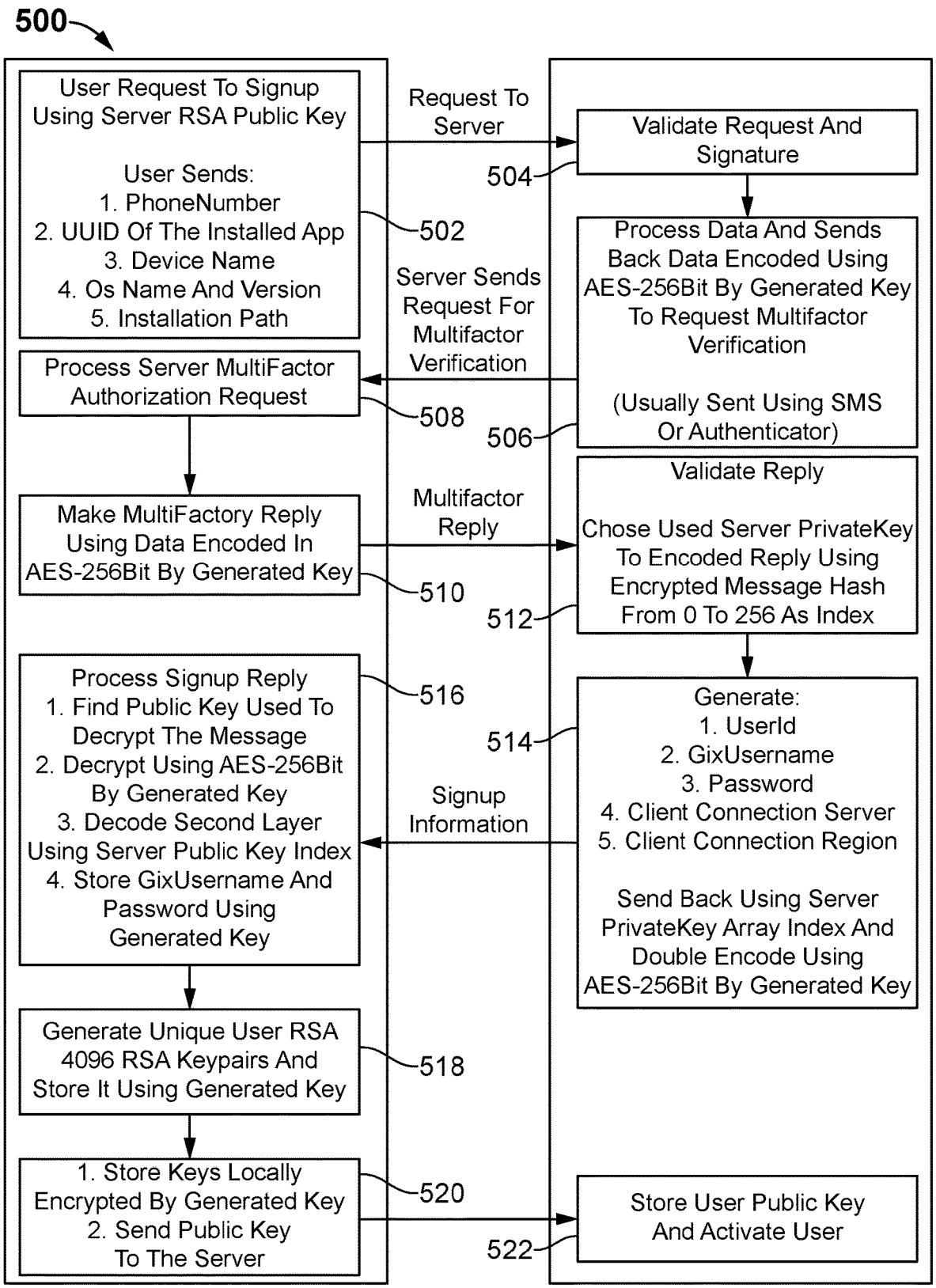
FIG. 5 exemplarily illustrates a method of signup implemented according to an embodiment of the present invention.

FIG. 5 exemplarily illustrates a method 500 of signup implemented according to an embodiment of the present invention. In one embodiment, the method 500 is implemented in the system comprising a computing device comprising a processor and a memory unit in communication with the processor, wherein the memory stores a key generator executable by the processor, wherein the memory unit stores a key generator executable by the processor, a database in communication with the computing device, and a user device including the storage medium is configured to access the computing device via a network. At step 502, the user requests to sign up using server RSA public key by inputting data, such as phone number, UUID of the installed application, device name, OS name and version and installation path. At step 504, the user requests and signature are validated. At step 506, the data is processed and encoded using AES-256 bit by a key generated to request multifactor verification. The server sends the request for multifactor verification.

At step 508, the multifactor authorization request in processed. At step 510, a multi-factor reply is outputted using data encoded in AES-256 bit by the key generated. At step 512, the multi-factor reply is validated. For validation, used server private key is chose to encode reply using encrypted message hash from 0 to 256 as index. At step 514, user identification data, gixusername, password, client connection server and client connection region are generated. The generated data is sent back using server private key array index and double encode using AES-256 bit by the key generated. At step 516, the sign-up reply is processes. A method of processing involves: finding public key used to decrypt the message; decrypting using AES-256 bit by the key generated, decoding second layer using server public key index; and storing gixUsername and password using the generated key. At step 518, unique keypairs are generated and stored using the generated key of the system. At step 520, encrypted keypairs are stored locally and the public key is sent to the server. At step 522, user public key is stored and the account of the user is activated.

According to the present invention, the system works under any operating system (including, without limitation, DOS, OS/2, and AIX) to protect all confidential information on a computer disk or other storage media during those periods in which the machine is not in use. The invention protects against thieves, lunchtime attacks and other invasions of privacy. The invention is useful on so-called "portables" (i.e., laptop, notebook and subnotebook computers), desktop machines (i.e., personal computers or workstations), pen-based machines, other handheld computers including personal data assistants ("PDA's"), smartcards and the like. The present invention could be used in login, data storage and signup process. The system is configured to keep keys secure against memory attacks and bind the encryption key to the user device and session and hardware specific data.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A system for securing data in a storage medium, comprising:
   a computing device comprising a processor and a memory unit in communication with the processor, wherein the memory unit stores a set of instructions executable by the processor;
   a database in communication with the computing device, and
   a user device including the storage medium is configured to access the computing device via a network, wherein the computing device is configured to:
   collect one or more parameters from at least one of the user device or the computing device, wherein server paired parameters include application installation session UUID, application installation session hash, installation path, phone number, OS name and signup request epoch time;
   generate a seed key based on the parameters using a random digest algorithm,
   generate a key using the seed key and MD5 and semi-random SHA encryption, and
   use the key to encrypt or decrypt data that accesses to and from a portion of the storage medium.

2. The system of claim 1, wherein the computing device is a server.

3. The system of claim 1, wherein the parameters is at least one of a server paired parameters and user device parameters.

4. The system of claim 3, wherein the user device parameters are application installation session UUID, application installation session hash, installation path, phone number, OS name and signup request epoch time, and application modification date epoch time.

5. The system of claim 1, is configured to create a unique seed key for each user device.

6. The system of claim 1, is configured to execute encrypt and decrypt process through inline function without storing keys.

7. The system of claim 1, wherein the user device is at least one of a tablet computer, personnel computer, personnel digital assistant, smart phone, smart television, palm top, phablet, laptop, or a device with computational capability connected to the internet.

8. The system of claim 1, wherein the memory unit is at least one of a volatile memory, non-volatile memory, read only memory (ROM), random access memory (RAM), and a flash memory.

9. The system of claim 1, wherein the network is at least one of a Local Area Network, a Wide Area Network, a Wireless Network, a telecommunication network, a mobile network, and an Internet.

10. A method for securing data in a storage medium incorporated in a system comprising a computing device comprising a processor and a memory unit in communication with the processor, wherein the memory unit stores a set of instructions executable by the processor, a database in communication with the computing device, and a user device including the storage medium is configured to access the computing device via a network, wherein said user device consists of parameters, wherein said parameters include application installation session UUID, application installation session hash, installation path, phone number, OS name and signup request epoch time, and application modification date epoch time, wherein the method comprising the steps of:
    collect one or more parameters from the user device;
    generating a seed key based on the parameters using a random digest algorithm;
    generating a key using the seed key and MD5 and semi-random SHA encryption, and
    using the key to encrypt or decrypt data that accesses to and from a portion of the storage medium.

11. The method of claim 10, wherein the parameters are user device parameters.

12. The method of claim 10, further comprises a step of creating a unique seed key for each user device.

13. The method of claim 10, further comprises a step of executing encrypt and decrypt process through inline function without storing keys.

14. A method for securing communication of information, incorporated in a system comprising a computing device comprising a processor and a memory unit in communication with the processor, wherein the memory unit stores a set of instructions executable by the processor, a database in communication with the computing device, and a user device including the storage medium is configured to access the computing device via a network, wherein the method comprising the steps of:
    collect one or more parameters from the user device, wherein the parameters are user device parameters; wherein said user device parameters include application installation session UUID, application installation session hash, installation path, phone number, OS name and signup request epoch time, and application modification date epoch time;
    collect one or more parameters from the computing device, wherein the parameters are server paired parameters;
    generating a seed key based on the parameters using a random digest algorithm;
    generating a key using the seed key and MD5 and semi-random SHA encryption, and
    using the key to encrypt or decrypt data that accesses to and from a portion of the storage medium.

15. The method of claim 14, wherein the computing device is a server.

16. The method of claim 14, wherein the server paired parameters include application installation session UUID, application installation session hash, installation path, phone number, OS name and signup request epoch time.

17. The method of claim 14, further comprises a step of executing encrypt and decrypt process through inline function without storing keys.

\* \* \* \* \*